(12) United States Patent
Shen et al.

(10) Patent No.: US 12,377,789 B2
(45) Date of Patent: Aug. 5, 2025

(54) ROOF CROSSBAR HAVING LOCKS

(71) Applicants: Xiaoling Shen, Zhejiang (CN); Ran Chen, Zhejiang (CN)

(72) Inventors: Xiaoling Shen, Zhejiang (CN); Ran Chen, Zhejiang (CN)

(73) Assignee: Ningbo Pinchuan Auto Parts Co., Ltd., Ningbo (CN)

( * ) Notice: Subject to any disclaimer, the term of this patent is extended or adjusted under 35 U.S.C. 154(b) by 209 days.

(21) Appl. No.: 18/346,810

(22) Filed: Jul. 4, 2023

(65) Prior Publication Data

US 2024/0166140 A1 May 23, 2024

(30) Foreign Application Priority Data

Nov. 21, 2022 (CN) .......................... 202211455898.2

(51) Int. Cl.
*B60R 9/058* (2006.01)
(52) U.S. Cl.
CPC .................................... *B60R 9/058* (2013.01)
(58) Field of Classification Search
CPC ....................................................... B60R 9/058
USPC ........................................ 224/322, 325, 329
See application file for complete search history.

(56) References Cited

U.S. PATENT DOCUMENTS

| | | | | |
|---|---|---|---|---|
| 2,682,982 A | * | 7/1954 | Fischer, Jr. ............ | A01K 97/08 224/317 |
| 4,684,049 A | * | 8/1987 | Maby ....................... | B60R 9/12 224/329 |
| 5,492,258 A | * | 2/1996 | Brunner .................. | B60R 9/045 224/322 |
| 5,641,107 A | * | 6/1997 | Mann ...................... | B60R 9/058 224/331 |
| 6,105,841 A | * | 8/2000 | Aftanas .................. | B60R 9/045 224/322 |
| 6,112,965 A | * | 9/2000 | Lundgren ............... | B60R 9/045 224/322 |
| 6,279,802 B1 | * | 8/2001 | Hickman .................. | B60R 9/05 224/326 |
| 6,959,844 B2 | * | 11/2005 | Potter ..................... | F16B 2/185 224/325 |
| 8,104,651 B2 | * | 1/2012 | Bingham ................ | B60R 9/058 224/322 |
| 10,160,394 B2 | * | 12/2018 | Kraeuter ................. | B60R 9/058 |
| 11,230,230 B2 | | 1/2022 | Schafer, Jr. | |
| 11,312,312 B2 | * | 4/2022 | Yang ...................... | B60R 9/058 |

(Continued)

FOREIGN PATENT DOCUMENTS

| | | | | | |
|---|---|---|---|---|---|
| DE | | 3428154 A | * | 2/1986 | ............. B60R 9/058 |
| DE | | 3709335 A | * | 10/1988 | ............. B60R 9/058 |

*Primary Examiner* — Justin M Larson

(57) ABSTRACT

The present disclosure relates to a roof crossbar having locks, including two clamping devices and a main cross beam mounted between the two clamping devices, wherein each of the clamping devices includes a fixing seat, a locking bolt and an anti-theft assembly which are mounted on the fixing seat, and a clamping assembly connected to the locking bolt, the locking bolt penetrates through the fixing seat from top to bottom to be connected to the clamping assembly, a storage cavity is formed between the anti-theft assembly and the fixing seat, the end of the locking bolt that is away from the clamping assembly is located inside the storage cavity, and a clamping port is formed between the clamping assembly and the fixing seat.

11 Claims, 3 Drawing Sheets

(56) References Cited

U.S. PATENT DOCUMENTS

| | | |
|---|---|---|
| 11,351,926 B2 | 6/2022 | Chervu |
| 11,912,241 B2 * | 2/2024 | Christensen ............ B60R 9/048 |
| 2020/0148126 A1 | 5/2020 | Griffith et al. |
| 2022/0032852 A1 | 2/2022 | Chervu |
| 2023/0086932 A1 | 3/2023 | Tullberg |
| 2023/0112227 A1 | 4/2023 | Telukunta et al. |
| 2024/0166140 A1 * | 5/2024 | Shen ....................... B60R 9/058 |

* cited by examiner

ROOF CROSSBAR HAVING LOCKS

TECHNICAL FIELD

The present disclosure relates to the field of auto parts, in particular to a roof crossbar having locks.

BACKGROUND

A roof crossbar, also known as a roof rack, is a support mounted on roof longitudinal beams to facilitate carrying large articles. The roof crossbar includes a main cross beam and two clamping seats mounted on the main cross beam, and the clamping seats can clamp the longitudinal beams at the roof of an automobile such that the roof crossbar can be fixed to the roof of the automobile. The clamping seats are generally locked by means of exposed locking bolts. However, the locking bolts are exposed outside, so that they are easily dismounted and stolen, which causes losses and greatly reduces the use experience of users.

SUMMARY

On this basis, it is necessary to provide a roof crossbar having locks, which has an anti-theft function and has the high practicability, so as to solve the problems of the existing roof crossbar.

The roof crossbar having locks comprises two clamping devices and a main cross beam mounted between the two clamping devices, wherein each of the clamping devices comprises a fixing seat, a locking bolt and an anti-theft assembly which are mounted on the fixing seat, and a clamping assembly connected to the locking bolt, the locking bolt penetrates through the fixing seat from top to bottom to be connected to the clamping assembly, a storage cavity is formed between the anti-theft assembly and the fixing seat, the end of the locking bolt that is away from the clamping assembly is located inside the storage cavity, and a clamping port is formed between the clamping assembly and the fixing seat.

With regard to the above roof crossbar having locks, during usage, the anti-theft assemblies are dismounted from the fixing seats, then the fixing seats are placed on roof longitudinal beams, the locking bolts penetrate through the fixing seats from top to bottom to be connected to the clamping assemblies, then the locking bolts are tightened for clamping and fixing on the roof longitudinal beams, and finally, the anti-theft assemblies are mounted on the fixing seats to prevent the locking bolts from being exposed outside. Due to the arrangement of the anti-theft assemblies, the locking bolts can be prevented from being exposed outside, and it is not easy to dismount the locking bolts by tools and then steal the entire roof crossbar having locks. The roof crossbar having locks has the anti-theft function and the high practicability.

In one of the embodiments, each of the anti-theft assemblies comprises a lock cover and a lock cylinder assembled with the lock cover, and the lock cylinder is movably connected to the corresponding fixing seat.

In one of the embodiments, a lock head portion is arranged on each of the lock cylinders, a lock port is formed in each of the fixing seats, and the lock head portion is adapted to the corresponding lock port.

In one of the embodiments, each of the clamping assemblies comprises a movable seat and a clamping plate mounted on the movable seat, and the movable seat is located below the corresponding fixing seat and is connected to the corresponding locking bolt.

In one of the embodiments, an inserting groove is formed in each of the movable seats, and one end of each of the clamping plates is located inside the corresponding inserting groove.

In one of the embodiments, a rivet nut is further mounted on each of the movable seats, and the rivet nut penetrates through the corresponding movable seat and the corresponding clamping plate from top to bottom and is connected to the corresponding locking bolt.

In one of the embodiments, each of the clamping assemblies further comprises a protective sleeve mounted on the corresponding clamping plate, and the protective sleeve is located below the corresponding fixing seat.

In one of the embodiments, an adjusting hole is formed in each of the fixing seats, adjusting bolts are mounted on the main cross beam, and the adjusting bolts penetrate through the adjusting holes from bottom to top.

In one of the embodiments, each of the adjusting holes is a waist-type hole extending in the lengthwise direction of the main cross beam.

In one of the embodiments, the roof crossbar having locks further comprises protective pads mounted on the fixing seats, and the protective pads are located at the bottoms of the fixing seats.

BRIEF DESCRIPTION OF THE DRAWINGS

Drawings constituting a portion of the present application are used for providing a further understanding to the present disclosure. Schematic embodiments of the present disclosure and descriptions thereof are intended to explain the present disclosure, and should not be construed to unduly limit the present disclosure. In the drawings.

DETAILED DESCRIPTION OF THE EMBODIMENTS

The present disclosure is described in detail below with reference to the accompanying drawings and in conjunction with embodiments. Each example is provided to explain the present disclosure instead of limiting the present disclosure. In fact, those skilled in the art will know that modifications and variations may be made in the present disclosure without departing from the scope or spirit of the present disclosure. For example, features shown or described as one part of one embodiment may be applied to another embodiment to generate yet another embodiment. Therefore, it is expected that the present disclosure includes such modifications and variations that fall within the scope of the appended claims and equivalents thereof.

In the descriptions of the present disclosure, orientations or positional relationships indicated by the terms "longitudinal", "transverse", "upper", "lower", "front", "rear", "left", "right", "vertical", "horizontal", "top", "bottom" and the like are orientations or positional relationships based on the drawings, are only for the purpose of facilitating describing of the present disclosure, and do not indicate that the present disclosure must be constructed and operated in the specific orientations. Therefore, they cannot be understood as limitations on the present disclosure. The terms "connection", "connecting" and "arrangement" used in the present disclosure should be understood in a broad sense, for example, the connection may be fixed connection, and may also be detachable connection; the connection may be direct connection, and may also be indirect connection by means of intermediate components; the connection may be wired electrical connection and wireless electrical connection, and may also be wireless communication signal connection; and for those of ordinary skill in the art, the specific meanings of the above-mentioned terms can be understood according to the specific situations.

The accompanying drawings show one or more examples of the present disclosure. Numeral and letter marks are used in the detailed descriptions to refer to the features in the accompanying drawings. Similar or like marks in the accompanying drawings and the descriptions have been used to refer to similar or like parts of the present disclosure. As used herein, the terms "first", "second", "third" and the like are used interchangeably so as to distinguish one component from another, and are not intended to indicate the positions or the importance of the individual components.

Figure 1:
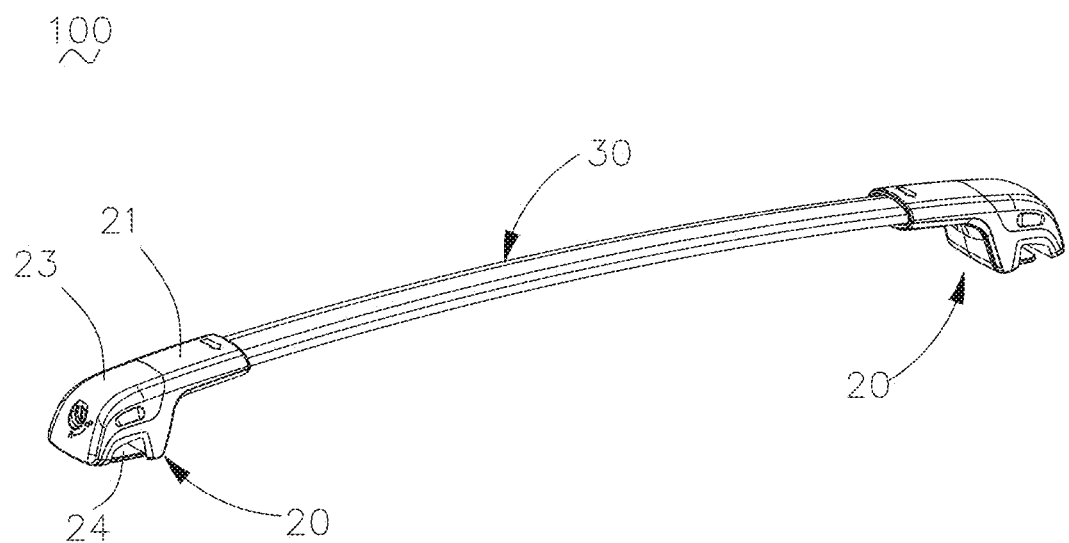
FIG. 1 is a schematic diagram of a roof crossbar having locks of an embodiment of the present disclosure.
Figure 2:
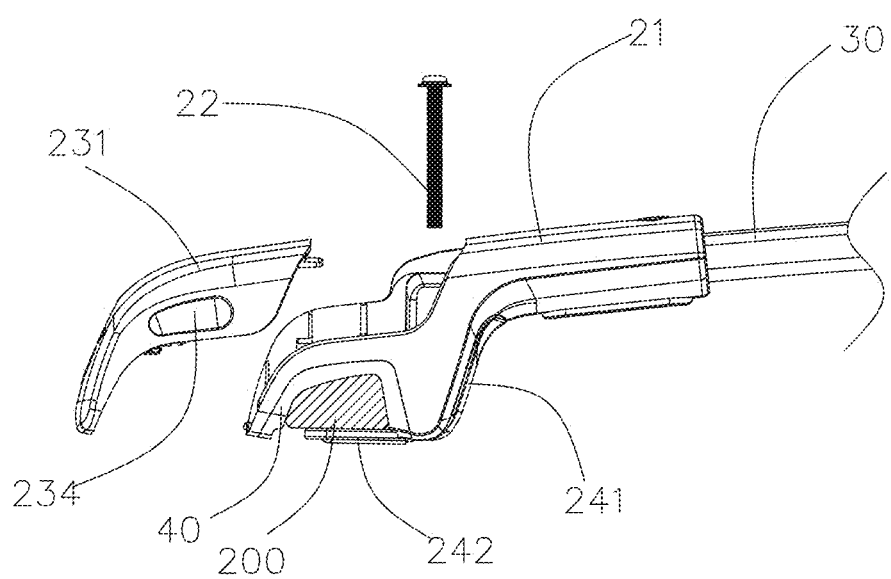
FIG. 2 is a schematic diagram of the roof crossbar having locks as shown in FIG. 1 in a mounting process.
Figure 3:
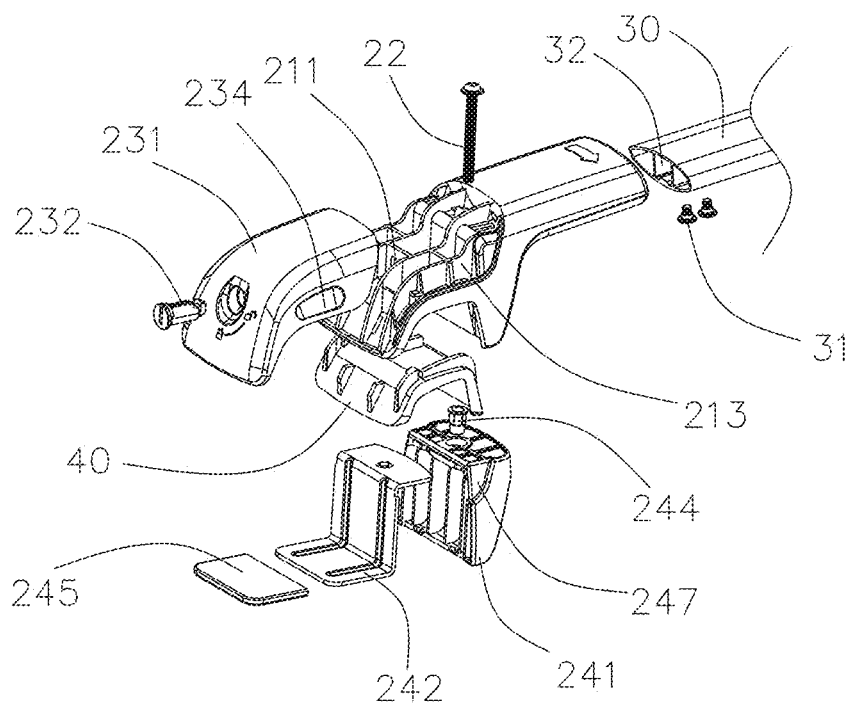
FIG. 3 is a partial exploded view of the roof crossbar having locks as shown in FIG. 1.
Figure 4:
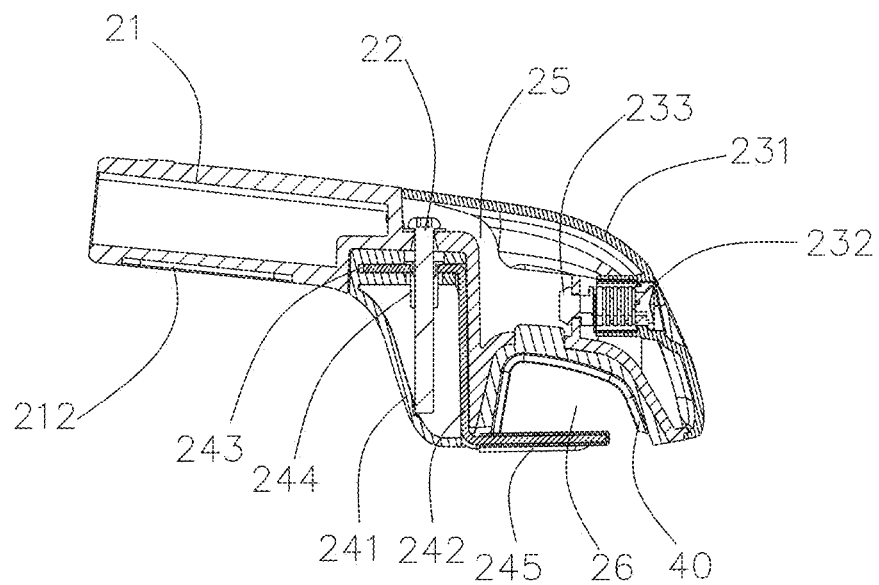
FIG. 4 is a sectional view of a clamping device as shown in FIG. 1.
Figure 5:
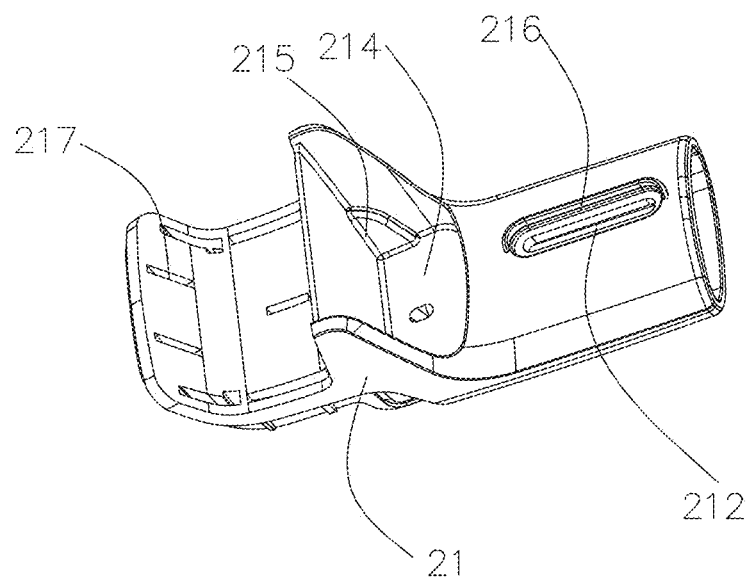
FIG. 5 is a schematic diagram of a fixing seat of the clamping device as shown in FIG. 4.
Figure 6:
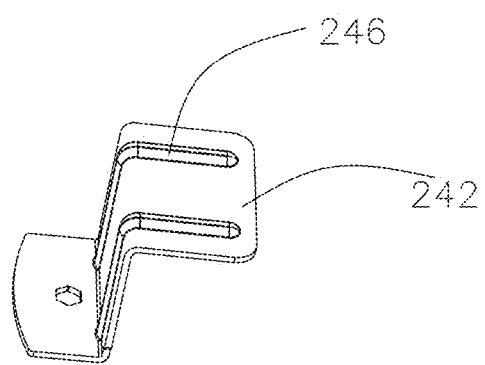
FIG. 6 is a schematic diagram of a clamping plate of the clamping device as shown in FIG. 4.

FIGS. 1-6 show a roof crossbar 100 having locks of an embodiment of the present disclosure. The roof crossbar 100 having locks comprises two clamping devices 20 and a main cross beam 30 mounted between the two clamping devices 20, wherein during usage, the entire roof crossbar 100 having locks is mounted on roof longitudinal beams 200 by means of the two clamping devices 20.

Further, each of the clamping devices 20 comprises a fixing seat 21, a locking bolt 22 and an anti-theft assembly 23 which are mounted on the fixing seat 21, and a clamping assembly 24 connected to the locking bolt 22, the locking bolt 22 penetrates through the fixing seat 21 from top to bottom to be connected to the clamping assembly 24, a storage cavity 25 is formed between the anti-theft assembly 23 and the fixing seat 21, the end of the locking bolt 22 that is away from the clamping assembly 24 is located inside the storage cavity 25, and a clamping port 26 is formed between the clamping assembly 24 and the fixing seat 21. The locking bolts 22 in this embodiment are pan-head hexagon socket bolts, may also be bolts of other types in other embodiments, and are not limited herein.

Further, each of the anti-theft assemblies 23 comprises a lock cover 231 and a lock cylinder 232 assembled with the lock cover 231, the lock cylinder 232 is movably connected to the corresponding fixing seat 21, and the lock cover 231 can be locked and fixed to the corresponding fixing seat 21 by means of the lock cylinder 232. A lock head portion 233 is arranged on each of the lock cylinders 232, a lock port 211 is formed in each of the fixing seats 21, and the lock head portion 233 is adapted to the corresponding lock port 211. Specifically, each of the lock head portions 233 is of a trapezoidal block structure, each of the lock ports 211 is a rectangular port, thus after a key is inserted into each of the lock cylinders 232, the lock head portion 233 penetrates through the lock port 211 to rotate by 90°, and the locking state can be achieved; and when unlocking is needed, all that is required is to reversely rotate the lock head portion by 90° and then drive the lock head portion 233 to exit from the lock port 211. Further, stress grooves 234 are formed in two sides of each of the lock covers 231, and force application is facilitated during mounting and dismounting of the lock covers 231 due to the arrangement of the stress grooves 234.

Further, each of the clamping assemblies 24 comprises a movable seat 241 and a clamping plate 242 mounted on the movable seat 241, and the movable seat 241 is located below the corresponding fixing seat 21 and is connected to the corresponding locking bolt 22. To achieve better connection with the locking bolts 22, threaded holes may be formed in the movable seats 241. In order to ensure the stability of each of the clamping plates 242 mounted on the corresponding movable seat 241, an inserting groove 243 is formed in the movable seat 241, and one end of the clamping plate 242 is located inside the inserting groove 243, so that when a downward force is applied to the other end of the clamping plate 242, the clamping plate 242 is located inside the inserting groove 243 and will apply an opposite force, and the stability is high. In an embodiment, a rivet nut 244 is further mounted on each of the movable seats 241, and the rivet nut 244 penetrates through the corresponding movable seat 241 and the corresponding clamping plate 242 from top to bottom and is connected to the corresponding locking bolt 22. The overall stability of the movable seats 241 and the clamping plates 242 can be enhanced through the arrangement of the rivet nuts 244, and the clamping plates 242 can be prevented from falling due to the pull force.

Further, each of the clamping assemblies 24 further comprises a protective sleeve 245 mounted on the corresponding clamping plate 242, the protective sleeve 245 is located below the corresponding fixing seat 21, the damage to the corresponding roof longitudinal beam 200 during clamping is reduced by means of the protective sleeve 245, and the protectiveness is high. Anti-slip protrusions 246 are arranged at the bottom of each of the clamping plates 242, and the anti-slip protrusions 246 can effectively prevent the corresponding protective sleeve 245 from slipping on the clamping plate 242, thereby achieving stable mounting. In addition, the anti-slip protrusions 246 are located at the bottom of each of the clamping plates 242 and do not affect the balanced application of the clamping force to the plane of the bottom surface of the corresponding roof longitudinal beam 200. In this embodiment, there are two anti-slip protrusions 246 which extend in the lengthwise direction of the main cross beam 30.

Further, an adjusting hole 212 is formed in each of the fixing seats 21, adjusting bolts 31 are mounted on the main cross beam 30, and the adjusting bolts 31 penetrate through the adjusting holes 212 from bottom to top. Through the arrangement of the adjusting holes 212 and the adjusting bolts 31, the length of the entire roof crossbar 100 having locks can be changed, and the mounting adaptivity to different models and sizes is improved. In this embodiment, each of the adjusting holes 212 is an elongated hole extending in the lengthwise direction of the main cross beam 30, and thus stepless adjustment in a certain length range can be achieved. In other embodiments, the adjusting holes 212 may also be a plurality of round holes arranged at preset intervals, and thus changing adjustment in preset distances can be achieved. In order to enhance the structural strength of the fixing seats 21, reinforcing ribs 213 are arranged on the fixing seats 21. In order to further improve the structural strength, the reinforcing ribs 213 are perpendicular to each other. In this embodiment, an accommodating groove 214 is formed in each of the fixing seats 21, and each of the movable seats 241 is located on the corresponding accommodating groove 214, so that the periphery of the movable seat 241 can be well limited. Further, limiting blocks 215 are arranged on inner walls of the accommodating grooves 214, limiting ports 247 are formed in outer walls of the movable seats 241, and the limiting ports 247 are adapted to the limiting blocks 215. Further, a guide portion 216 is arranged on each of the fixing seats 21, and the guide portion 216 is distributed around the corresponding adjusting hole 212, thereby facilitating mounting of the adjusting bolts 31.

Further, the roof crossbar 100 having locks further comprises protective pads 40 mounted on the fixing seats 21, and the protective pads 40 are located at the bottoms of the fixing seats 21, thereby protecting the roof longitudinal beams 200. Each of the fixing seats 21 is provided with a plurality of mounting bayonets 217, the corresponding protective pad 40 is adaptively mounted on the mounting bayonets 217 by means of a buckle structure, and thus convenient and quick mounting and dismounting are achieved.

The clamping plates 242 of this embodiment are of right-angled Z-shaped structures, and in other embodiments, the shapes of the clamping plates 242 can be changed according to the different roof longitudinal beams 200. The shapes of the protective pads 40 can be changed according to the roof longitudinal beams 200 of different models, and thus the protective pads can be adapted to more models. The movable seats 241 can be adjusted downwards as required within the range of 40 mm, and the clamping ports 26 are large in size, thereby facilitating mounting of the roof longitudinal beams 200. The main cross beam 30 of this embodiment is of a hollow tubular structure, thereby saving materials and reducing the weight. In another embodiment, reinforcing strips 32 are arranged inside the main cross beam 30, and the reinforcing strips 32 can well improve the support strength of the main cross beam 30.

With regard to the above roof crossbar 100 having locks, during usage, the anti-theft assemblies 23 are dismounted from the fixing seats 21, then the fixing seats 21 are placed on the roof longitudinal beams 200, the locking bolts 22 penetrate through the fixing seats 21 from top to bottom to be connected to the clamping assemblies 24, then the locking bolts 22 are tightened for clamping and fixing on the roof longitudinal beams 200, and finally, the anti-theft assemblies 23 are mounted on the fixing seats 21 to prevent the locking bolts 22 from being exposed outside. Due to the arrangement of the anti-theft assemblies 23, the locking bolts 22 can be prevented from being exposed outside, and it is not easy to dismount the locking bolts 22 by tools and then steal the entire roof crossbar 100 having locks. The roof crossbar having locks has the anti-theft function, the high practicability and the good use experience.

The technical features of the above embodiments can be combined arbitrarily. In order to simplify the description, possible combinations of the technical features of the above embodiments are not completely described. However, as long as there is no contradiction between the combinations of these technical features, the combinations should be considered to fall within the scope of the present specification.

The above embodiments only express several embodiments of the present disclosure, and relatively specific and detailed descriptions thereof are provided. However, these embodiments cannot be understood as limitations on the scope of the patent of the present disclosure. It should be pointed out that for those of ordinary skill in the art, several modifications and improvements can be made without departing from the idea of the present disclosure, and all these modifications and improvements should fall within the scope of protection of the present disclosure. Therefore, the scope of protection of the patent of the present disclosure should be subject to the claims. The above is merely illustrative of the preferred embodiments of the present disclosure and is not intended to limit the present disclosure, and various modifications and changes may be made by those skilled in the art. Any modification, equivalent substitution, improvement, etc. made within the spirit and principles of the present disclosure should fall within the scope of protection of the present disclosure.

What is claimed is:

1. A roof crossbar having locks, comprising:
   two clamping devices and a main cross beam mounted between the two clamping devices, wherein each of the clamping devices comprises: a fixing seat, a locking bolt and an anti-theft assembly which are mounted on the fixing seat, and a clamping assembly connected to the locking bolt; the locking bolt penetrates through the fixing seat along a longitudinal direction of the locking bolt to be connected to the clamping assembly, a storage cavity is formed between the anti-theft assembly and an inner side of the fixing seat, an end of the locking bolt that is away from the clamping assembly is located inside the storage cavity,
   wherein each of the clamping assemblies comprises a movable seat and a clamping plate mounted on the movable seat, an outer side of the fixing seat defines a bending section and an accommodating groove, the movable seat is received in the accommodating groove, a proximal end of the anti-theft assembly is connected to a front end of the bending section, and a clamping port formed between the bending section and the clamping plate.

2. The roof crossbar having locks according to claim 1, further comprising a protective pad mounted on each of the fixing seats, and the protective pad is located at a bottom of each of the fixing seats.

3. The roof crossbar having locks according to claim 1, wherein each of the anti-theft assemblies comprises a lock cover and a lock cylinder assembled with the lock cover, and the lock cylinder is movably connected to the corresponding fixing seat.

4. The roof crossbar having locks according to claim 3, wherein a lock head portion is arranged on each of the lock cylinders, a lock port is formed in each of the fixing seats, and the lock head portion is adapted to the corresponding lock port.

5. The roof crossbar having locks according to claim 1, wherein an adjusting hole is formed in each of the fixing seats, adjusting bolts are mounted on the main cross beam, and the adjusting bolts penetrate through the adjusting holes from bottom to top.

6. The roof crossbar having locks according to claim 5, wherein each of the adjusting holes is an elongated hole extending in a lengthwise direction of the main cross beam.

7. The roof crossbar having locks according to claim 1, wherein the movable seat is located below the corresponding fixing seat and is connected to the corresponding locking bolt.

8. The roof crossbar having locks according to claim 7, wherein an inserting groove is formed in each of the movable seats, and one end of each of the clamping plates is located inside the corresponding inserting groove.

9. The roof crossbar having locks according to claim 7, wherein a rivet nut is further mounted on each of the movable seats, and the rivet nut penetrates through the corresponding movable seat and the corresponding clamping plate along a longitudinal direction of the rivet nut and is connected to the corresponding locking bolt.

10. The roof crossbar having locks according to claim 7, wherein each of the clamping assemblies further comprises a protective sleeve mounted on the corresponding clamping plate, and the protective sleeve is located below the corresponding fixing seat.

11. A roof crossbar having locks, comprising:

two clamping devices and a main cross beam mounted between the two clamping devices, wherein each of the clamping devices comprises: a fixing seat, a locking bolt and an anti-theft assembly which are mounted on the fixing seat, and a clamping assembly connected to the locking bolt; the locking bolt penetrates through the fixing seat along a longitudinal direction of the locking bolt to be connected to the clamping assembly, a storage cavity is formed between the anti-theft assembly and the fixing seat, an end of the locking bolt that is away from the clamping assembly is located inside the storage cavity, and a clamping port is formed between the clamping assembly and the fixing seat;

each of the clamping assemblies comprises a movable seat and a clamping plate mounted on the movable seat, and the movable seat is located below the corresponding fixing seat and is connected to the corresponding locking bolt; and a rivet nut is further mounted on each of the movable seats, and the rivet nut penetrates through the corresponding movable seat and the corresponding clamping plate along a longitudinal direction of the rivet nut and is connected to the corresponding locking bolt.

* * * * *